United States Patent Office 3,244,703
Patented Apr. 5, 1966

3,244,703

THIAZINE, THIAZOLINE, AND THIAZOLINONE COMPOUNDS

John Yates, Chestfield, Whitstable, Herbert P. Rosinger, Tunstall, near Sittingbourne, and Johannes Th. Hackmann, Herne Bay, England, assignors to Shell Oil Company, New York, N.Y., a corporation of Delaware No Drawing. Filed Oct. 18, 1962, Ser. No. 231,549
Claims priority, application Great Britain, Oct. 19, 1961, 37,515/61
10 Claims. (Cl. 260—243)

This invention relates to the novel heterocyclic compounds hereinafter specified and to a process for their preparation. These compounds have herbicidal properties, being especially toxic to germinating seeds. Accordingly, this invention also relates to herbicidal compositions containing said novel compounds, to the use of said compounds and compositions for combatting weeds, particularly weed seeds, and to a method for eradicating weeds from crop areas bearing, or intended to bear crops, which comprises applying to said areas a compound or composition of the invention.

The novel compounds of the invention have the general formula

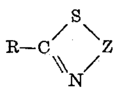

wherein R represents a 2,6-dichlorophenyl group;

Z represents divalent group of the class consisting of unsubstituted alkylene and alkenylene of from 2 to 4 carbon atoms; such substituted by one alkyl of from 1 to 2 carbon atoms; alkylene of from 2 to 4 carbon atoms in which the carbon atom bonded to the indicated nitrogen atom is substituted by an oxygen (=O) atom; such substituted by one alkyl of from 1 to 4 carbon atoms; alkylene of from 2 to 4 carbon atoms substituted on the carbon atom bonded to the indicated sulfur atom by alkoxycarbonyl of from 2 to 3 carbon atoms, and the hydrohalide salts of such compounds. In the alkyl-substituted alkylene and alkenylene compounds, it appears preferable, from the standpoint of the herbicidal properties, that the alkyl substituent be substituted on one of the carbon atoms that forms a part of the heterocyclic ring.

The salts of hydrohalic acids, particularly hydrochloric and hydrobromic acids, are formed by the treatment with the acids.

The novel compounds of the invention may exist in tautomeric forms and these are included in the scope of the invention.

The present invention also provides processes for the preparation of the aforesaid novel compounds. One general method for the preparation of compounds of the above general formula wherein the organic group represented by Z is linked to S and to N by a carbon atom, comprises reacting at an elevated temperature a 2,6-dihalothiobenzamide, with a compound of formula XZX′ wherein X and X′ each represent a halogen atom or a sulphuric ester group and Z represents an organic group linked to X and X′ by carbon atoms. The respective reactions involved may be represented by the following equations:

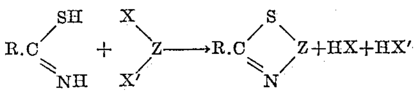

The reactants are heated together for several hours, the actual temperatures and period of heating depending on the particular reactants employed. In general, reaction temperatures in the range 50° to 150° C., preferably about 100° C. and periods of 2 to 24 hours may be used. The reaction may be effected in an inert solvent, for example, an alcohol such as ethyl alcohol or glycol, an ethereal solvent such as dimethoxyethane, dioxane or tetrahydrofurane, a ketonic solvent such as acetone, or a hydrocarbon solvent such as benzene or toluene. The reaction may be effected in presence or absence of a hydrogen halide acceptor, for example, a tertiary nitrogenous base such as pyridine or triethylamine. Anhydrous or substantially anhydrous conditions are preferably employed. This process is particularly suitable for the preparation of compounds of the invention in which Z represents an alkylene group or an alkylene group substituted by one or more alkyl groups. The desired reaction product may be produced in the form of its hydrohalide. This can readily be converted to the free base by treatment with an alkali or alkaline reacting salt, for example aqueous sodium bicarbonate or sodium acetate.

Examples of compounds which can be made by this method from 2,6-dichlorothiobenzamide and the dihalide X—Z—X′ are given below:

| X—Z—X′ | Product |
|---|---|
| $Br(CH_2)_nBr$ where $n$=2, 3 or 4 | |

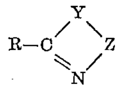

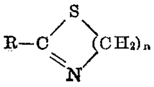

Compounds of the above general formula in which Y represents a sulphur atom may be prepared according to the invention by cyclising a 2,6-dihalobenzamide derivative of formula

R.CO.NH.Z.OH wherein R and Z have the aforesaid meanings, by treatment respectively with phosphorus pentasulphide. The reaction may be represented by the following equations:

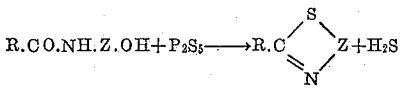

The group represented by Z should not contain any atoms or groups which will be affected under the reaction conditions. The reaction is effected by heating the reactants together, preferably in an inert solvent, for example, a hydrocarbon solvent such as toluene. Temperatures in the range 80° to 150° C. are suitable. In this way were prepared, for example, 2-(2,6-dichlorophenyl)-1,3-thiazoline.

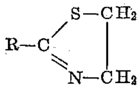

and the 4-methyl, 5-ethyl, 4,4-dimethyl and 4,5-dimethyl derivatives.

Compounds of the invention containing a 5-membered heterocyclic ring substituted by an oxo group may be prepared by reacting a 2,6-dihalothiobenzamide with a compound containing an α-halo-carbonyl group, for example, an α-haloketone or an α-halocarboxylic acid, ester, acid halide or acid anhydride, particularly with the α-chloro- or α-bromo-carbonyl compounds. The reaction may be carried out by heating the reactants together in absence of a solvent or in the presence of an inert solvent, for example a hydrocarbon solvent, preferably an aromatic hydrocarbon solvent such as toluene or a halogenated hydrocarbon solvent. Water produced in the reaction is preferably removed, for example, azeotropically. Reaction temperatures in the range 70° to 120° C. are in general satisfactory but higher or lower temperatures may be used if desired. Examples of compounds which may be made by this process from 2,6-dichlorothiobenzamide and the α-halocarbonyl compound stated are given below.

| | α-Halocarbonyl compound | Product 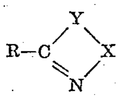 |
|---|---|---|
| (A) | α-Haloketone ClH2.CO.CH3C | 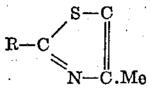 |
| (B) | α-Halocarboxylic ester chloride or anhydride | Product |
| | 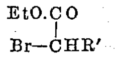 | 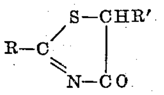 |
| | (R'=Me, Et, n—Pr, n—Bu) | or a tautomer thereof |
| | 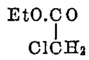 | 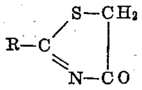 |
| | | or a tautomer thereof |
| | 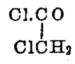 | 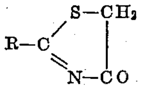 |
| | | or a tautomer thereof |
| | 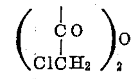 | 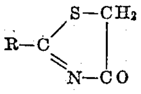 |
| | | or a tautomer thereof |
| | 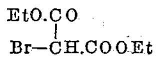 | 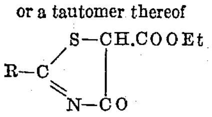 |

The heterocyclic compound is in general produced in the form of a hydrohalide which is readily converted to the free base by treatment with alkali.

The following examples illustrate the novel compounds of the invention and their preparation. In these examples, parts by weight (w.) and parts by volume (v.) bear the same relation as the kilogram and the litre, and, in the formulae the symbol R' represents the 2,6-dichlorophenyl group.

EXAMPLE I

*Preparation of 2-(2,6-dichlorophenyl)-1,3-thiazoline*

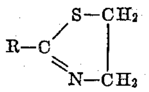

2,6-dichlorothiobenzamide (10 w.) and ethylene dibromide (10 v.) were heated together on a boiling water bath for 6 hours. The cooled product was washed three times with 50 v. of hexane and three times by boiling with benzene (50 v.). The pale brown somewhat sticky insoluble residue was boiled four times with ethanol (50 v.). The alcohol extract was evaporated to small bulk and water added until cloudy. Crystals separated on cooling. These were recrystallised from aqueous methanol to give white prisms (2 v.), M.P. 73° C.

*Analysis.*—Found: N, 6.0; Cl, 30.5; S, 13.6%. $C_9H_7Cl_2NS$ requires: N, 6.0; Cl, 30.6; S, 13.8%.

EXAMPLE II

*Preparation of 2-(2,6-dichlorophenyl)-5,6-dihydro-4H-1,3-thiazine and its hydrobromide*

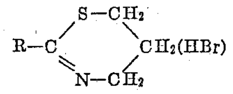

A mixture of 2,6-dichlorothiobenzamide (50 w.), 1,3-dibromopropane (50 v.) and 1,2-dimethoxyethane (250 v.) was heated at refluxing temperature for 18 hours, the solid which separated being periodically removed by filtration. The combined solids were washed well with ether and air dried to give a white powder (60 w.) melting at 196° to 198° C. with decomposition.

*Analysis.*—Found: C, 34.1; H, 2.5; N, 4.3; S, 11.6; Br, 24.2%. $C_{10}H_{10}BrCl_2NS$ requires: C, 36.5; H, 3.1; N, 4.3; S, 9.8; Br, 24.4%.

The compound was shaken with water (50 v.) and filtered. The clear solution was treated with a slight excess of aqueous sodium bicarbonate solution and the thiazine thereby precipitated was collected and air-dried. Crystallisation from light petroleum (B.P. 80° to 100° C.) gave white plates, melting at 104° to 105° C. The mixed melting point with the product obtained in Example XI showed that the products were identical.

EXAMPLE III

*Preparation of 2-(2,6-dichlorophenyl)-4-methyl-1,3-thiazoline and its hydrochloride*

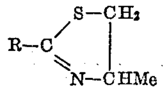 (.HCl)

2,6-dichlorothiobenzamide (20 w.) and 1,2-dibromopropane (50 v.) were heated together under reflux for 8 hours and then cooled. The semi-solid mass so obtained was triturated with ether until brown colour was no longer eluted. The grey residue (25 w.) was shaken with 2 N-hydrochloric acid (500 v.) and filtered from tar. The filtrate was neutralised with sodium bicarbonate and then extracted with ether. The ether extract was dried over anhydrous magnesium sulphate, the ether removed and the residue distilled, the thiazoline being obtained as a yellow oil B.P. 114° C. at 1.5 mm. pressure.

*Analysis.*—Found: C, 49.2; H, 3.9; N, 6.0; Cl, 29.4; S, 13.0%. $C_{10}H_9Cl_2NS$ requires: C, 48.8; H, 3.7; N, 5.7; Cl, 28.9; S, 13.0%.

The hydrochloride was prepared by dissolving the thiazoline (10 w.) in ether (500 v.) and then saturating the solution with hydrogen chloride. The white precipitate was filtered off, washed with ether and air-dried. It had M.P. 205° to 206° C. with decomposition.

*Analysis.*—Found: C, 42.1; H, 3.3; N, 4.8; Cl, 37.3; S, 11.7; $Cl^-$, 12.7%. $C_{10}H_{10}NSCl_3$ requires: C, 42.5; H, 3.5; N, 5.0; Cl 37.7; S, 11.3; $Cl^-$, 12.6%.

EXAMPLE IV

*Preparation of 4-methyl-2-(2,6-dichlorophenyl) thiazole hydrochloride*

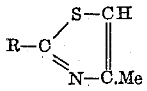 .HCl

A mixture of 2,6-dichlorothiobenzamide (20 w.) and chloroacetone (10 w.) was refluxed in benzene (350 v.) for 18 hours under a Dean and Stark head. Hydrogen chloride was evolved and water was collected. Benzene was stripped off and the residue was extracted six times with 200 v. of light petroleum (B.P. 60° to 80° C.). The insoluble tarry matter was rejected. The solution was evaporated to small bulk and cooled whereon a small amount (0.8 w.) of 2,6-dichlorothiobenzamide separated and was removed. The remaining solution was freed from solvent and the residue distilled, an oil boiling at 117° C. under 0.5 mm. and containing some suspended solid being obtained. The distillate was dissolved in ether and treated with dry hydrogen chloride, a white powder (10 w.) being obtained which melted at 175° C. with shrinkage from 169° C.

*Analysis.*—Found: C, 42.8; H, 2.7; N, 5.3; Cl, 38.2%. $C_{10}H_8Cl_3NS$ requires: C, 42.6; H, 2.8; N, 5.0; Cl, 38.0%.

EXAMPLE V

*Preparation of 2-(2,6-dichlorophenyl)-1,3-thiazol-2-in-4-one*

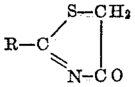

2,6-dichlorothiobenzamide (50 w.) and ethyl chloroacetate (33 w.) were heated together on a steam bath until a homogeneous solution was obtained. Ethanol and hydrogen chloride were then removed from the mixture under reduced pressure. The residual solid was triturated with boiling ether and crystallised from ethanol. The thiazolone formed colourless prisms (15 w.), M.P. 212° C.

*Analysis.*—Found: C, 44.0; H, 1.9; N, 5.6; Cl, 28.8; S, 12.9%. $C_9H_5NSOCl_2$ requires: C, 43.9; H, 2.0; N, 5.7; Cl, 28.8; S, 13.0%.

EXAMPLE VI

*Preparation of 5-ethyl-2-(2,6-dichlorophenyl)-1,3-thiazolin-4-one*

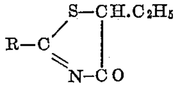

2,6-dichlorothiobenzamide (20 w.) and ethyl 2-bromobutyrate (25 w.) were heated together on a boiling water bath. The solid slowly dissolved and then soldification commenced. After 2 hours benzene (200 v.) was added, the mixture was refluxed for 2 hours and then filtered hot. The residual solid was washed with hot benzene to give a white powder (25 w.), M.P. about 215° C. Crystallisation from ethanol gave colourless prisms M.P. 232° C.

*Analysis.*—Found: C, 48.0; H, 3.3; N, 5.3; Cl, 25.8; S, 11.8%. $C_9H_{11}Cl_2NOS$ requires: C, 48.2; H, 3.3; N, 5.1; Cl, 25.9; S, 11.7%.

EXAMPLE VII

*Preparation of 2-(2,6-dichlorophenyl)-5-n-propyl-1,3-thiazol-2-in-4-one*

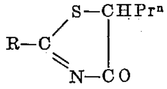

2,6-dichlorothiobenzamide (20 w.) and ethyl 2-bromovalerate (30 w.) were heated together at 100° C. for 4 hours. The initial solution became semi-solid and, after cooling, the mixture was triturated with cold ether. The residue was crystallised from methanol giving pale lemon yellow crystals (10.5 w.), M.P. 205° to 207° C.

*Analysis.*—Found: C, 50.4; H, 3.6; N, 4.6; Cl, 24.9; S, 11.1%. $C_{12}H_{11}Cl_2NOS$ requires: C, 50.0; H, 3.8; N, 4.9; Cl, 24.7; S, 11.1%.

EXAMPLE VIII

*Preparation of 5-n-butyl-2-(2,6-dichlorophenyl)-1,3-thiazol-2-in-4-one*

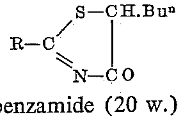

2,6-dichlorothiobenzamide (20 w.) and ethyl 2-bromocaproate (30 w.) were heated together for 6 hours at 100° C. The resulting solution became semi-solid on cooling. The mixture was dissolved in the minimum of hot methanol. The crystals which separated on cooling were recrystallised from ethanol to give white needles (5.5 w.), M.P. 165° C.

*Analysis.*—Found: C, 51.7; H, 4.0; N, 4.5; Cl, 23.6; S, 10.9%. $C_{13}H_{13}Cl_2NOS$ requires: C, 51.6; H, 4.3; N, 4.6; Cl, 23.5; S, 10.6%.

EXAMPLE IX

*Preparation of 2-(2,6-dichlorophenyl)-5-ethoxycarbonyl thiazolin-4-one*

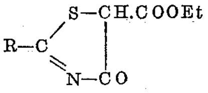

2,6-dichlorothiobenzamide (10.3 w.), diethyl bromomalonate (12.0 w.) and methanol (200 v.) were refluxed together for 8 hours. The solvent was then removed and the residue crystallised from ethanol. The product (6.0 w.) had M.P. 110° to 113° C.

*Analysis.*—Found: C, 45.1; H, 3.0; N, 4.4; Cl, 22.8; S, 10.2. $C_{12}H_9Cl_2NO_3S$ requires: C, 45.3; H, 2.8; N, 4.4; Cl, 22.3; S, 10.1%.

EXAMPLE X

*Preparation of 2-(2,6-dichlorophenyl)-5-methyl-2-thiazoline*

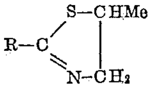

A mixture of N-(2-hydroxypropyl)-2,6-dichlorobenzamide (7.0 w.) and phosphorus pentasulphide (5.0 w.) in toluene (100 v.) was refluxed for 12 hours. The toluene layer was decanted and extracted with dilute aqueous hydrochloric acid and the gummy residue extracted with hot dilute hydrochloric acid. The acid extracts were combined and then made alkaline. The product was extracted with chloroform, the extract dried over anhydrous magnesium sulphate, the chloroform removed and the residue distilled. The portion boiling at 187° to 188° C. under 12 mm. pressure was collected. Yield 2.0 w.

*Analysis.*—Found: C, 48.6; H, 3.6; N, 5.9; Cl, 29.9; S, 13.4%. $C_{10}H_9Cl_2NS$ requires: C, 48.8; H, 3.7; N, 5.7; Cl, 28.9; S, 13.0%.

EXAMPLE XI

*Preparation of 2-(2,6-dichlorophenyl)-5,6-dihydro-4H-1,3-thiazine*

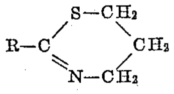

A mixture of N-(3'-hydroxypropyl)-2,6-dichlorobenzamide (10 w.) and phosphorus pentasulphide (5 w.) in toluene (100 v.) was refluxed for 12 hours. The toluene layer was then decanted and the gummy residue extracted with hot dilute aqueous hydrochloric acid. The acid extract was then made alkaline and the precipitated solid was filtered off, washed with water, dried and recrystallised from light petroleum (B.P. 80°–100° C.). A further quantity of product was obtained by extracting the toluene layer with aqueous hydrochloric acid, working up the extract in the same way. Total yield of recrystallised product 4 w., M.P 103° to 104°.

*Analysis.*—Found: C, 48.9; H, 3.4; N, 5.9; Cl, 29.0; S, 13.1%. $C_{10}H_9Cl_2NS$ requires: C, 48.8; H, 3.7; N, 5.7; Cl, 28.9; S, 13.0%.

EXAMPLE XII

*Preparation of 2-(2,6-dichlorophenyl)-4-ethyl-2-thiazoline*

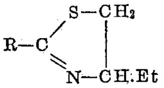

This compound was prepared from N-(2-hydroxy-1-ethylethyl)-2,6-dichlorobenzamide R.CO.NH.CHEt.$CH_2OH$ (7.0 w.) and phosphorus pentasulphide (5.0 w.) by the method described in Example XXII. The product had B.P. 206° C. under 20 mm. pressure. Yield 3 w.

*Analysis.*—Found: C, 50.9; H, 4.3; N, 5.6; Cl, 28.3; S, 13.5%. $C_{11}H_{11}Cl_2NS$ requires: C, 50.8; H, 4.2; N, 5.4; Cl, 27.3; S, 12.3%.

The compounds of the invention possess, interalia, herbicidal activity. These compounds are highly toxic to germinating seeds and are therefore suitable for use in destroying weed seeds in areas prior to sowing or planting a crop. Some of these compounds are toxic when sprayed on foliage. The results of herbicidal tests carried out with some of the more active compounds of the invention are summarised in the following table. These tests were carried out as follows:

Aqueous compositions containing acetone (40 v.), water (60 v.), Triton X–155 (0.5% w./v.) and the compound specified in logarithmically varying concentrations were used. In the soil spray and soil drench tests, imbibed seeds and seedling plants respectively in sterile No. 1 John Innes compost, were sprayed at 50 gallons per acre or drenched at 1000 gallons per acre. In the foliar spray tests, similar seedling plants were sprayed with a volume equivalent to 50 gallons per acre. Control tests in which seeds and plants were similarly sprayed or drenched with the aqueous acetone—Triton X–155 solution only—were also carried out. The phytotoxic effect of the compound applied was assessed by determining the reduction from the control in fresh weight of stem and leaf of the test plants and a regression curve relating growth inhibition and dosage plotted. The dosage of the compound required for 50% and 90% growth inhibition (G.I.) is given in the table. Dosages greater than 10 pounds per acre are indicated by X.

TABLE I

| Compound or tautomer thereof | G.I. level, percent | Growth inhibition dose, lb./acre | | | | | | | | | | | | | | | | | | | | |
|---|---|---|---|---|---|---|---|---|---|---|---|---|---|---|---|---|---|---|---|---|---|---|
| | | Seeds—Pre-emergence—Soil spray | | | | | | | Plants—Post-emergence | | | | | | | | | | | | | |
| | | | | | | | | | Foliar spray | | | | | | | Soil drench | | | | | | |
| | | O | RG | SC | P | SB | L | M | O | RG | SC | P | SB | L | M | O | RG | SC | P | SB | L | M |
| 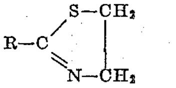 | 50 | <0.9 | 3.7 | x | 3.1 | 2.0 | 6.0 | 7.7 | x | x | 6.0 | 9.5 | 8.6 | 7.5 | 7.0 | x | x | x | x | x | x | x |
| | 90 | <0.9 | 7.2 | x | 5.9 | 6.6 | x | x | x | x | 10.0 | x | x | x | x | x | x | x | x | x | x | x |
| 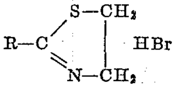 | 50 | <0.9 | <0.9 | <0.9 | <0.9 | <0.9 | <0.9 | <0.9 | 2.6 | x | 3.3 | x | x | x | 9.7 | x | x | x | x | x | x | x |
| | 90 | <0.9 | <0.9 | 1.4 | 1.7 | <0.9 | 0.9 | 1.0 | x | x | 9.2 | x | x | x | x | x | x | x | x | x | x | x |
| 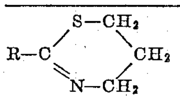 | 50 | 2.6 | <0.9 | 4.7 | 3.4 | 1.3 | 5.2 | 5.7 | x | x | x | x | x | x | x | 6.0 | 1.3 | x | x | x | x | x |
| | 90 | 3.5 | <0.9 | 9.3 | 6.7 | 2.3 | x | x | x | x | x | x | x | x | x | x | x | x | x | x | x | x |
| 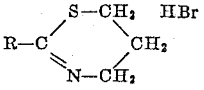 | 50 | <0.9 | <0.9 | 1.4 | 1.9 | <0.9 | <0.9 | 1.0 | 6.8 | 6.4 | 3.3 | 3.9 | 5.2 | x | x | 2.0 | 2.2 | <1.0 | 10.0 | <1.0 | x | 4.2 |
| | 90 | <0.9 | <0.9 | 1.9 | 3.7 | <0.9 | 1.4 | 1.3 | x | x | x | x | x | x | x | x | x | 10.0 | x | x | x | x |
| 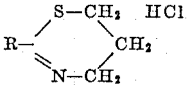 | 50 | 1.2 | <0.9 | 4.1 | 2.9 | 1.3 | 2.9 | 2.5 | x | 7.8 | 5.4 | 8.1 | 6.6 | x | x | 2.8 | 5.2 | 4.9 | x | 9.1 | x | x |
| | 90 | 2.2 | <0.9 | 6.8 | 8.3 | 1.9 | 6.0 | 6.0 | x | x | x | x | x | x | x | x | x | x | x | x | x | x |
| 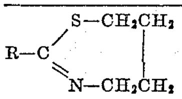 | 50 | <1.2 | <1.2 | 4.0 | 1.7 | <1.2 | 1.2 | 2.1 | 9.4 | 8.5 | x | x | 4.5 | 5.7 | 2.2 | <1.0 | <1.0 | x | 7.6 | x | x | x |
| | 90 | <1.2 | <1.2 | x | 5.7 | 1.3 | 2.0 | 5.8 | x | x | x | x | 9.1 | x | 8.5 | x | x | x | x | x | x | x |
| 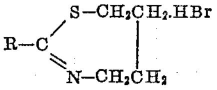 | 50 | <1.2 | <1.2 | x | 7.7 | 1.6 | 2.5 | x | x | x | 6.6 | x | 4.5 | 8.0 | 2.6 | 6.8 | 1.0 | x | x | x | x | x |
| | 90 | 1.6 | <1.2 | x | x | 2.8 | x | x | x | x | x | x | 7.2 | x | 5.4 | x | x | x | x | x | x | x |
| 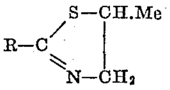 | 50 | 2.7 | 2.0 | 5.4 | 2.8 | 4.1 | 7.4 | 10.0 | x | x | 7.8 | x | 5.7 | x | x | x | 9.5 | x | x | x | x | x |
| | 90 | 3.7 | 4.0 | x | 8.5 | 6.7 | x | x | x | x | x | x | x | x | x | x | x | x | x | x | x | x |
| 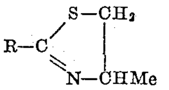 | 50 | 1.8 | 1.8 | x | 6.8 | 6.2 | 10.5 | 9.7 | x | 9.1 | x | x | x | x | 5.6 | 8.5 | x | x | x | x | x | x |
| | 90 | 4.4 | 3.7 | x | 9.3 | 7.2 | x | x | x | x | x | x | x | x | 9.6 | x | x | x | x | x | x | x |
| 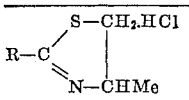 | 50 | 2.5 | 3.1 | x | 6.8 | 6.8 | x | 9.5 | x | x | x | 8.8 | 5.4 | x | 4.2 | x | x | x | x | x | x | x |
| | 90 | 4.0 | 4.6 | x | 9.3 | 9.0 | x | x | x | x | x | x | 7.5 | x | 5.9 | x | x | x | x | x | x | x |
| 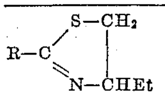 | 50 | 3.2 | 4.7 | x | x | 8.0 | 7.0 | x | x | x | 7.5 | x | x | x | 8.5 | 9.4 | x | x | x | x | x | x |
| | 90 | 4.1 | 6.1 | x | x | x | x | x | x | x | x | x | x | x | x | x | x | x | x | x | x | x |

TABLE I.—*Continued*

| Compound or tautomer thereof | G.I. level, percent | Growth inhibition dose, lb./acre | | | | | | | | | | | | | | | | | | | | |
|---|---|---|---|---|---|---|---|---|---|---|---|---|---|---|---|---|---|---|---|---|---|---|
| | | Seeds—Pre-emergence—Soil spray | | | | | | | Plants—Post-emergence | | | | | | | | | | | | | |
| | | | | | | | | | Foliar spray | | | | | | | Soil drench | | | | | | |
| | | O | RG | SC | P | SB | L | M | O | RG | SC | P | SB | L | M | O | RG | SC | P | SB | L | M |
| 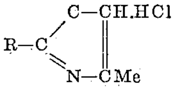 | 50 | 2.6 | 3.6 | x | 2.9 | 3.2 | x | 7.1 | x | x | x | x | x | x | x | x | x | x | x | xx | x | x |
| | 90 | 3.6 | 5.2 | x | 5.8 | 5.2 | x | 9.7 | x | x | x | x | x | x | x | x | x | x | x | x | x | x |
| 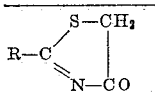 | 50 | <0.9 | <0.9 | 1.1 | 1.2 | <0.9 | <0.9 | 1.0 | 8.8 | 7.5 | 2.1 | x | x | x | x | <1.0 | 10.0 | <1.0 | 5.5 | <1.0 | x | 4.0 |
| | 90 | <0.9 | <0.9 | 2.5 | 2.5 | <0.9 | <0.9 | 1.4 | x | x | x | x | x | x | x | x | x | 8.5 | x | x | x | x |
| 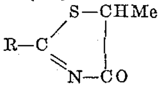 | 50 | <0.9 | <0.9 | 2.3 | 1.4 | <0.9 | <0.9 | 1.6 | x | x | 6.1 | x | 5.2 | x | x | <1.0 | <1.0 | <1.0 | <1.0 | <1.0 | x | x |
| | 90 | <0.9 | <0.9 | 4.7 | 2.9 | <0.9 | 1.9 | 2.5 | x | x | x | x | x | x | x | x | x | x | x | x | x | x |
| 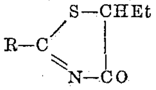 | 50 | <0.9 | <0.9 | 1.9 | 2.5 | <0.9 | 1.8 | 2.3 | x | 6.3 | x | x | 8.2 | x | x | 2.2 | <1.0 | 4.8 | x | x | x | x |
| | 90 | 1.4 | <0.9 | 7.5 | 5.5 | 1.1 | 3.6 | 4.2 | x | x | x | x | x | x | x | x | x | x | x | x | x | x |
| 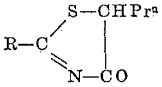 | 50 | <1.2 | <1.2 | 2.8 | 2.1 | <1.2 | <1.2 | 1.3 | x | 8.2 | x | x | x | x | x | 1.6 | <1.0 | 6.2 | x | 10.0 | x | x |
| | 90 | <1.2 | <1.2 | 7.5 | 4.4 | <1.2 | <1.2 | 1.9 | x | x | x | x | x | x | x | x | x | x | x | x | x | x |
| 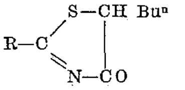 | 50 | <1.2 | <1.2 | <1.2 | <1.2 | <1.2 | <1.2 | <1.2 | x | 6.7 | x | x | 7.2 | x | x | <1.0 | <1.0 | 1.0 | 8.0 | 2.5 | x | x |
| | 90 | <1.2 | <1.2 | 2.0 | 1.8 | <1.2 | <1.2 | <1.2 | x | x | x | x | x | x | x | x | x | x | x | x | x | x |
| 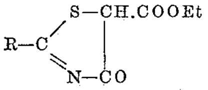 | 50 | 1.8 | <1.0 | 7.1 | 5.8 | 0.9 | 3.0 | 4.0 | x | x | x | x | 7.0 | x | x | 8.0 | 10.0 | x | x | 8.0 | x | x |
| | 90 | 2.3 | 1.6 | x | x | 1.5 | 4.5 | 5.5 | x | x | x | x | x | x | x | x | x | x | x | x | x | x |

This invention relates further to compositions comprising a compound as hereinbefore specified as active ingredient and a carrier or a surface active agent, or a carrier and a surface active agent.

The term "carrier" as used herein means a material, which may be inorganic or organic and synthetic or of natural origin, with which the active substance is mixed or formulated to facilitate its storage, transport and handling and its application to the plant, seed, soil or other object to be treated. The carrier is preferably biologically and chemically inert. It may be a solid or a fluid. Solid carriers are preferably particulate, granular or pelleted though other shapes and sizes are not thereby excluded. Solid carriers, generally obtainable in particulate, granular or pelleted form, may be naturally occurring minerals, for example a clay, though they may have been subjected to grinding, sieving, purification and other treatments. Carriers produced synthetically, for example, synthetic hydrated silicon oxides and synthetic calcium silicates may also be used and many proprietary products of this type are available commercially. The product available as Silicium dioxyd No. 3 is a particularly suitable carrier of this type. The carrier may also be an elemental substance such as sulphur or carbon, preferably an activated carbon. If the carrier possesses intrinsic catalytic activity such that it would decompose the active ingredient it is advantageous to incorporate a stabilising agent.

For some purposes, a resinous or waxy carrier may be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax, for example, beeswax or a mineral wax such as paraffin wax or Montan wax, or a chlorinated mineral wax. Compositions comprising such resinous or waxy carriers are preferably in granular or pelleted form.

Fluid carriers may be liquids, for example an aqueous fluid, or an organic fluid, including a liquefied normally vaporous or gaseous material, or a vaporous or gaseous material, and may be solvents or non-solvents for the active ingredient. Suitable solvents include petroleum fractions boiling in the kerosine and gas oil ranges and aromatic extracts thereof, ketones such as acetone, methyl ethyl ketone, methyl isobutyl ketone and cyclohexanone, aromatic hydrocarbons, such as benzene, toluene, and chlorinated hydrocarbons, for example carbon tetrachloride and the dichlorbenzenes.

The carrier may also be a simple or compound fertiliser which may be a solid, preferably granular or pelleted, or a liquid, for example an aqueous solution.

The carrier may be mixed or formulated with the active material during its manufacture or at any stage subsequently. The carrier may be mixed or formulated with the active material in any proportion. One or more carriers may be used.

The compositions of the invention may be concentrates, suitable for storage or transport and containing, for example, from 10 to 95% by weight of the active ingredient. These can be diluted with the same or a different carrier to a concentration suitable for application. The compositions of the invention may also be dilute compositions suitable for application. In general, concentrations of 0.01 to 0.5% by weight of active ingredient, based on the total weight of the composition, are satisfactory, though lower and higher concentrations can be applied if necessary. Effective weed control is obtainable by applying the compositions at the rate of 1 to 20 pounds per acre of the active ingredient.

The compositions of the invention may be formulated as dusts. These comprise an intimate mixture of the active ingredient and a finely powdered solid carrier such as is indicated above. These powder carriers may be oil-treated to improve adhesion to the surface to which they are applied. These dusts may be concentrates, in which case a highly sorptive carrier is preferably used. These require to be diluted with the same or a different finely powdered carrier, which may be of lower sorptive capacity, to a concentration suitable for application.

The compositions of the invention may be formulated as wettable powders comprising a major proportion of the active ingredient mixed with a dispersing, i.e. deflocculating or suspending agent, and, if desired, a finely divided solid carrier. The active ingredient may be in particulate form or adsorbed on the carrier and preferably constitutes at least 10%, more preferably at least 50% by weight of the composition. The concentration of the dispersing agent should in general be between 0.1 and 10% by weight of the total composition though larger or smaller amounts may be used if desired.

The dispersing agent used in the composition of the invention may be any substance having definite dispersing, i.e. deflocculating or suspending properties as distinct from wetting properties, although these substances may also possess wetting properties.

The dispersing agent used may be a protective colloid such as gelatin, glue, casein, gums or a synthetic polymeric material such as polyvinyl alcohol. Preferably, however, the dispersing agents used are sodium or calcium salts of high molecular weight sulphonic acids, e.g. the sodium or calcium salts of lignin sulphonic acids derived from sulphite cellulose waste liquors. The calcium or sodium salts of condenser aryl sulphonic acids, and sodium salts of polyacrylic acids are also suitable.

The dispersing agents used may be non-ionic or ionic, for example the condensation products of fatty acids containing at least 12, preferably 16 to 20, carbon atoms in the molecule with alkylene oxides such as ethylene oxide or propylene oxide or with both ethylene oxide and propylene oxide; partial esters of the above acids with polyhydric alcohols such as glycerol, polyglycerol, sorbitol or mannitol, or condensation products of alkyl phenols, e.g. p-octyl cresol with the above alkylene oxides or their sulphated or sulphonated derivatives.

The dispersing agents referred to above may also possess wetting properties but in general it is preferable to incorporate two separate surface active agents, one having particularly good dispersing properties and the other having particularly good wetting properties. The actual amount of wetting agent incorporated can be varied considerably and in general is from 0 to 10% by weight based on the total composition.

Suitable wetting agents include the alkali metal salts, preferably sodium salts, of sulphuric acid esters or sulphonic acids containing at least 10 carbon atoms in the molecule. Non-ionic wetting agents may also be employed, for example polyalkylene oxide polymers, e.g. the "Pluronics," and the above mentioned condensation products of alkyl phenols with alkylene oxides.

Granulated or pelleted compositions comprising a suitable carrier and the active ingredient incorporated therewith are also included in the invention. These may be prepared by impregnating a granular carrier with a solution of the active ingredient or by granulating a mixture of a finely divided solid carrier and the active ingredient. The carrier used may consist of or contain a fertiliser or fertiliser mixture, for example superphosphate.

The compositions of the invention may also be formulated as solutions of active ingredient in an organic solvent or mixture of solvents. Suitable solvents include alcohols, ketones, especially acetone, methyl ethyl ketone, methyl isobutyl ketone, cyclohexanone, ethers, aromatic hydrocarbons, chlorinated hydrocarbons, petroleum hydrocarbon fractions and aromatic extracts of kerosine. Auxiliary solvents such as alcohols, ketones and polyalkylene glycol ethers and esters may be used in conjunction with these petroleum solvents. Such oil solutions are particularly suitable for application by low volume spraying for example at the rate of 5 to 10 gallons per acre. They may also be diluted with a cheap solvent for high volume spraying.

Compositions of the present invention may also be formulated as emulsifiable concentrates which are concentrated solutions or dispersions of the active ingredient in an organic liquid, preferably a water-insoluble organic liquid, containing an added emulsifying agent. These concentrates may also contain a proportion of water for example up to 50% by volume, based on the total composition (i.e. a "mayonnaise" composition) to facilitate subsequent dilution with water. Suitable organic liquids are for example the above mentioned petroleum hydrocarbon fractions.

The emulsifying agent may be of the type producing water-in-oil or oil-in-water type emulsions which are suitable for application by low volume spraying, or an emulsifier of the type producing oil-in-water emulsions producing concentrates which can be diluted with relatively large volumes of water for application by high volume spraying may be used.

Suitable types of emulsifier for use in these emulsions or emulsifiable concentrates are the non-ionic and anionic dispersing and wetting agents described above, also suitable are long chain alkyl ammonium salts and alkyl sulpho-succinates.

The concentration of emulsifier used will in general be within the limits 0.5% and 25.0% based on the final composition.

The compositions of the invention may contain other ingredients, for example, water conditioning agents for example, sodium polyphosphates, cellulose ethers, or ethylene diamine tetra-acetic acid, other herbicides or pesticides, or stickers, for example a non-volatile oil.

Aqueous dispersions and emulsions, for example, compositions obtained by diluting the wettable powders or emulsifiable concentrates of the present invention with water also lie within the scope of the present invention.

What we claim is:

1. A member selected from the group consisting of a compound of the formula:

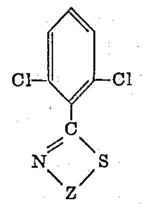

wherein Z represents a divalent radical of the class consisting of: unsubstituted alkylene of 2 carbon atoms; such a radical substituted by one alkyl of from 1 to 2 carbon atoms; alkylene of 2 carbon atoms in which the carbon atom bonded to the indicated nitrogen atom is substituted by an oxygen atom; such substituted by one alkyl of from 1 to 2 carbon atoms; alkylene of 2 carbon atoms substituted on the carbon atom bonded to the indicated sulfur atom by alkoxycarbonyl of from 2 to 3 carbon atoms, and the hydrohalide salts of such a compound.

2. A compound of the formula:

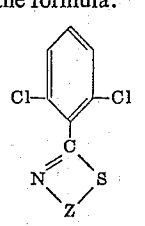

wherein Z is alkylene of 2 carbon atoms, substituted on one of the carbon atoms thereof by alkyl of from 1 to 2 carbon atoms.

3. A compound of the formula:

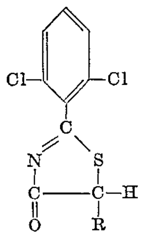

wherein R is alkyl of from 1 to 4 carbon atoms.

4. A compound of the formula:

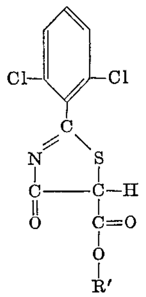

wherein R′ is alkyl of from 1 to 2 carbon atoms.

5. Hydrogen bromide salt of 2-(2,6-dichlorophenyl)-1,3-thiazoline.

6. Hydrogen bromide salt of 2-(2,6-dichlorophenyl)-5,6-dihydro-4H-1,3-thiazine.

7. 2-(2,6-dichlorophenyl)-4-methyl-1,3-thiazoline.

8. 5 - ethyl - 2-(2,6-dichlorophenyl)-1,3-thiazol-2-in-4-one.

9. 2-(2,6-dichlorophenyl)-1,3-thiazol-2-in-4-one.

10. 2-(2,6-dichlorophenyl)-5-ethoxycarbonyl-thiazolin-4-one.

References Cited by the Examiner

UNITED STATES PATENTS

| | | | |
|---|---|---|---|
| 2,547,682 | 4/1951 | Baumgartner | 71—2.5 |
| 2,579,478 | 12/1951 | Djerassi et al. | 260—243 |
| 2,693,408 | 11/1954 | D'Amico | 71—2.5 |
| 2,801,243 | 7/1957 | Hanslick et al. | 260—309 X |
| 2,946,788 | 7/1960 | Asinger et al. | 260—243 |
| 3,082,209 | 3/1963 | Surrey | 260—243 |

FOREIGN PATENTS

| | | |
|---|---|---|
| 815,203 | 6/1959 | Great Britain. |

OTHER REFERENCES

Migrdichian: "Organic Synthesis," vol. II, Reinhold Pub. Corp., 1957, page 1409.

Rodd: "Chemistry of Carbon Compounds," Heterocyclic Compounds, vol. IV[c], Elsevier Pub. Co., 1960, pp. 1503 and 1504.

WALTER A. MODANCE, *Primary Examiner.*

NICHOLAS S. RIZZO, *Examiner.*